WILLIAM H. BLOUNT

Oct. 19, 1937.  W. H. BLOUNT  2,096,605
UNIVERSAL SPRING COILING MACHINE
Filed Jan. 30, 1937   3 Sheets-Sheet 2

Inventor
WILLIAM H. BLOUNT
By Clayton L. Jenks
Attorney

Oct. 19, 1937.    W. H. BLOUNT    2,096,605
UNIVERSAL SPRING COILING MACHINE
Filed Jan. 30, 1937    3 Sheets-Sheet 3

Inventor
WILLIAM H. BLOUNT
By Clayton L. Jenks
Attorney

Patented Oct. 19, 1937

2,096,605

UNITED STATES PATENT OFFICE 2,096,605

UNIVERSAL SPRING COILING MACHINE

William H. Blount, Worcester, Mass., assignor of one-half to Sleeper & Hartley, Incorporated, Worcester, Mass., a corporation of Massachusetts Application January 30, 1937, Serial No. 123,097

14 Claims. (Cl. 153—65)

This invention relates to a universal spring coiling machine and more particularly to an automatic apparatus for coiling wire into the shape of a helical spring, which may be actuated continuously for forming a coil of indefinite length or which will form coils of predetermined lengths and sever each completed spring from the wire.

In accordance with the prior patent to Sleeper 1,266,070, a wire coiling mechanism may be operated intermittently by means of a gear segment driving through a ratchet and pawl, which is so arranged that when the segment is moving in one direction the wire is coiled and when moving in the opposite direction the wire feed is stopped and the coil severed from the wire. The length of the wire is limited by the degree of throw of the gear segment; hence, the machine cannot make a coil longer than a given length. If one attempted to operate the machine in such a manner as to prevent the wire cutter from contacting with the wire and the wire is then coiled continuously, it is found that the intermittent operation of the segment and the wire coiling parts produces an indentation in the wire coil at each reversal of motion of the segment. Hence, the machine cannot be operated satisfactorily to produce a continuous coil of wire.

It has also been proposed, in accordance with the patent to Sleeper 1,452,128, to drive the wire coiling mechanism by means of a cam controlled clutch mechanism, which is so arranged that the cam may be disconnected and leave the clutch continuously connected in a driving position so as to coil a piece of wire continuously. On the other hand, this type of machine can make automatically only such lengths of wire coils as are determined by the mechanisms found on the machine. For any other lengths of wire coil, it is necessary that the operator manually control the machine and determine by observation when to operate the wire cutter and sever the coil spring. This requires considerable care and skill on the part of the operator and is likely to produce coils of nonuniform lengths. Any attempt at substituting new gears or cams in such a machine, so as to control the length of spring will of course present many difficulties, such as requiring a large number of substitute parts which may become lost and wasting valuable time in taking out the old gears or cams and trying new ones to determine which will produce a desired length of coil. Hence, such a machine is seriously limited in its uses. It has consequently been necessary to provide three different types of machines for meeting the requirements of a plant which made various shapes of wire coils, the segment type being best for accuracy of dimensions of short coils, and the two other machines being respectively for continuous coiling and for long lengths cut automatically to size which were beyond the capacity of the segment type machine.

The object of the present invention is to provide a universal wire coiling machine which meets the needs of all three types heretofore used, in which wire may be coiled continuously into a coil of indeterminate length according to the will of the operator, or in which the machine may be so operated as to coil and cut off exact lengths varying from a very short coil to one of an extremely long length, and wherein the machine may be quickly adjusted to vary the length of the wire coil which is thus automatically produced. Further objects will be apparent in the following disclosure.

A wire coiling machine may be made of the general type shown in said Sleeper patents wherein the wire is forced by positively driven feed rolls against a coiling point and around an arbor which are so adjusted as to determine the diameter of the wire coil. The machine may also comprise adjustable features for controlling the pitch or separation of the coils of wire in the helix, and automatically actuated wire cutters are employed for severing the wire coil from the main line of wire after the coil has been formed. In accordance with the present invention, I propose to drive the feed rolls and to cut off the coils by means of change speed and cam controlled mechanisms which may be quickly adjusted to produce coils of any desired length within the requirements of the industry or which may be operated for coiling wire continuously without an automatic operation of the wire cutter. In this machine cams are provided which are so arranged that each revolution of a given cam controls the operation of its associated mechanism, such as the actuation of the wire cutter and the control of the positions of the diameter controlling point and the pitch determining tool. The operation of any one of these cam controlled mechanisms is determined by the length of time it takes for its particular cam to revolve while the wire is being fed at a continuous rate through the machine. The present invention deals primarily with that cam mechanism and associated parts which control the length of the wire coil, it being understood that the other mechanisms may be set to operate in timed relation therewith.

It is, therefore, a primary feature of this invention to provide change speed mechanism for the actuating cam which is so constituted that it will give an exceedingly great variation in the speed of the cam shaft and so cause the machine to operate either for a very short time or for a very long time before the cutting mechanism is caused to sever a given wire coil from the feeding wire. A further feature involves a construction which makes it possible to disconnect the cam controlling shaft from the driving mechanism and to stop the clutch instantaneously to prevent over-running of the wire feed when the coil is to be severed, and this mechanism is so constituted that the wire may be fed continuously while the cam operating mechanism is disconnected for a period of time which is determined by the will of the operator. Further important features involve so constructing the machine that by a simple adjustment of the change speed mechanism, any desired length of wire from, say, ¾ inch to 500 or more inches, may be automatically coiled without material loss of time in making the change.

This wire coiling machine may embody the various constructional features of the prior Sleeper patents which are compatible with the invention herein described; but for the sake of simplicity of illustration those features have been omitted from the drawings which relate to the control of the diameter and the pitch of the wire coil. The mechanisms which control these coil dimensions are however associated with the wire cutting and coiling mechanism herein described as is fully set forth in said prior patents. Referring to the drawings which illustrate one embodiment of this invention:

Figure 2:
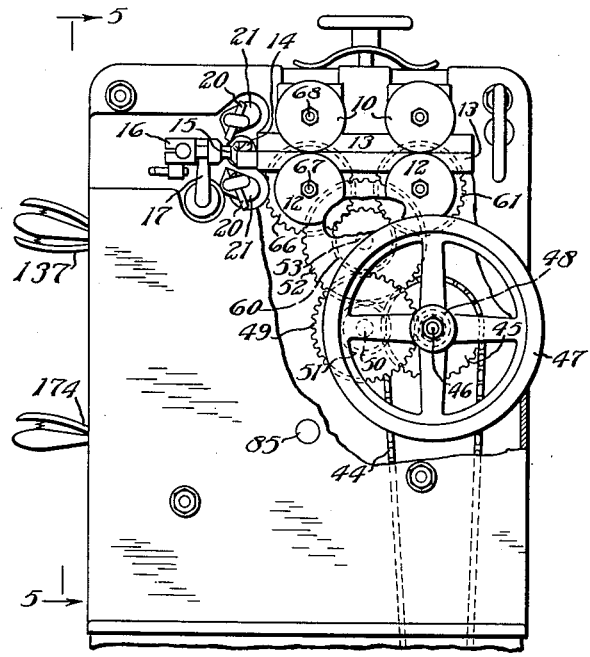
Fig. 2 is a front elevation of the upper half of the wire coiling machine, with parts broken away or in dotted outline to show the driving mechanism which feeds the wire.

That part of the construction which deals with the coiling of the wire, as shown primarily in Fig. 2, may be constructed as described in the Sleeper Patent 1,266,070. As illustrated, the machine comprises two sets of wire driving rolls 10 and 12 which have grooved peripheral faces adapted to grip a wire fed therebetween and to force that wire into contact with the coiling tool. The wire may be guided through a passage formed between two guide plates 13 so as to prevent the wire from buckling under the feeding pressure of the rolls. This wire is forced to pass over or under the arbor 14 and against a coiling point 15. This coiling point consists of a steel member having a grooved face so shaped, as described in the prior patent, that when the wire is forced thereagainst it will be bent into a coil whose radius is determined by the distance of the coiling point 15 from the arbor 14. This control of the diameter of the coil is effected by mounting the coiling point 15 on the slide 16 which may be moved to a desired position by a mechanism including an arm 17 riding in a groove in the side of the slide 16, which may be operated, if desired, in timed relation with the cam controlled mechanism hereinafter described.

Figure 6:
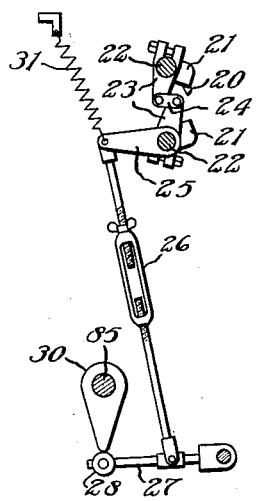
Fig. 6 is a fragmentary vertical elevation on the line 6—6 of Fig. 5 with the frame work and other parts removed which shows the cam operated cutter mechanism.

Cooperating with the arbor 14 is a pair of cutters 20 which are adjustably and removably mounted on a pair of radially swinging heads 21 so that either one may be forced to cut the wire close to the arbor. These heads 21 are in turn mounted upon shafts 22 (Fig. 6) adapted to be rotated about their axes by a cam mechanism when the feeding rollers have been stopped in their forward movement of the wire. These two shafts 22 are connected together by rock arms 23 and a link 24 so that the cutter heads will be operated together. A further rock arm 25 on the lower shaft 22 is connected by a turn buckle 26 and associated screw threaded parts to a lever 27 pivotally mounted on a suitable support. This lever has a roll member 28 pivotally mounted on the lever 27, which is struck by the revolving cam 30, so that it will be periodically thrust downward against the restraining force of a coiled spring 31 fastened to the base and to the rock arm 25 or other suitable part of the mechanism. By this construction, the wire cutter will be held in an inoperative position except when thrust forward into the wire under the force imparted thereto by the cam 30 and the lever operated thereby. Only one cutter will be used depending upon whether the wire is being coiled above or below the arbor 14, as will be understood.

The wire feeding rolls 10 and 12 are arranged to be driven at variable and controlled speeds from a suitable outside source of power, such as an electric motor 32 mounted in the bottom of the machine. In order to obtain a variable speed control for the feed rollers and the cam mechanism, the motor may be connected by a belt to a variable speed mechanism of the type of a "Reeves" variable speed transmission, which is diagrammatically illustrated in Fig. 1 of the drawings. This transmission comprises a set of cone shaped driving plates 33 slidably keyed on the shaft 34 which is driven through a belt connection from the electric motor. Another set of cone shaped plates 35 are likewise slidably keyed on a further shaft 36. A V-belt 37 rides with its side faces on the two sets of cone plates and serves to transmit power from the shaft 34 to the shaft 37. By means of a hand wheel 38 and shaft 39 threaded as right and left hand screws to move the sleeves 40 towards and from each other, the two levers 41 pivotally mounted on stationary supports 42 may be caused through intermediate sleeves 43 and suitable connections to move the two sets of plates towards and from each other, so that the upper set will be close together and cause the V-belt to ride high and the other set far apart, or vice versa, and thus give a variable speed drive to the shaft 36 from the constant speed shaft 34.

By means of a suitable belt or chain 44 power may be taken to a sprocket wheel 45 on the shaft 46 in the upper part of the machine. This shaft 46 also has a hand wheel 47 thereon, so that the machine may be manually adjusted as desired. A small gear 48 (Fig. 1) on the shaft 46 meshes with the larger gear 49 (Fig. 2) on a short jack shaft 50 which in turn drives a smaller gear 51 on the same shaft 50. The small gear 51 in turn meshes with a large gear 52 on a clutch controlled shaft 53. A clutch 54 suitably operated by hand may be employed to connect or disconnect the driven gear 45 from the shaft 46, so as to start and stop the wire coiling and cutting mechanism, and standard constructions may be employed for the purpose.

It will be understood that these various shafts are suitably mounted on the supporting framework of the machine such as the end wall 55 and an inner wall 56 which cooperates with another end wall 57 for carrying the change speed mechanism. The clutch shaft 53 which is mounted on the walls 55 and 56 has a gear 60 freely rotatable thereon and connectable with the shaft through a clutch. The gear 60 meshes with a gear 61 fixed on a further shaft 62 carrying the lower right hand driving roll 12 keyed thereon (Fig. 2). This shaft 62 likewise has a gear 63 (Fig. 1) connected therewith and meshing with a gear 64 on a further shaft 65, which has splined on its outer end the right hand roller 10 (Fig. 2). The gear 60 also meshes with a further gear 66 fixed on the shaft 67 (Fig. 2) carrying the left hand lower driving roll 12; and the shaft 67 has a gear (not shown) which connects with a gear on the shaft 68 (Fig. 2) and thus drives the upper left hand driving roll 10 thereon. By this arrangement, all of the wire feeding rolls will be driven by the clutch controlled power mechanism.

Referring now to Figs. 5, 6, 7, and 8, a cam operated mechanism has been provided which insures that the wire feeding movement will stop quickly and accurately just prior to the moment when the cam 30 is about to operate the lever system and cause the cutter to sever the coil from the wire. For this purpose, a clutch 70 of suitable construction is arranged to control the connection of the driving gear 60 with the drive shaft 53. This clutch may be of the multiple disk type but for the sake of simplicity of illustration, it has been shown as comprising a barrel 72 slidably keyed to the shaft 53 and provided with teeth on one end which engage suitably shaped teeth on the end of the drum 74, which is freely rotatable on the shaft 53 and is connected through an extension sleeve 75 with the gear 60. A yoke 77 is freely mounted in a groove in the clutch barrel so as to permit rotation of the latter within the yoke, and the yoke carries pins 78 which ride within the yoke arm 79 on the end of the lever 80. This lever is pivotally mounted on a suitable support 81 in the lower part of the machine so that lateral swinging of the lever will serve to connect or disconnect the clutch.

In order to operate the clutch automatically, the cam shaft 85, which carries the cam 30, has a further face cam 86 (Fig. 5) which is so shaped as to provide a track having a low part of short but suitable length and a high part along which the roller 88 pivotally mounted on the side of the lever 80, is adapted to ride. Hence, during the major part of each rotation of the cam shaft 85, the lever arm 80 will hold the clutch parts in engagement, and the gear 60 will drive the wire feeding rolls 10 and 12. But when the roller 88 drops down into the low portion of the cam face 86, then the clutch will be disengaged by the operation of the spring 89 suitably connected for the purpose between the lever and a part of the machine frame. The cam 30 and the cam 86 are so shaped and located on the shaft 85 that the high spot of the cam 30 will operate the cutter just after the roller 88 has dropped into the low part of the face cam 86 and the cutting operation will have been completed before the roller 88 travels up onto the high part of the face cam. It will be appreciated that each of these cams may be of the adjustable type whereby the length of time of effective operation or the nature thereof may be suitably adjusted.

Figures 3, 5, 7, 8, 10:
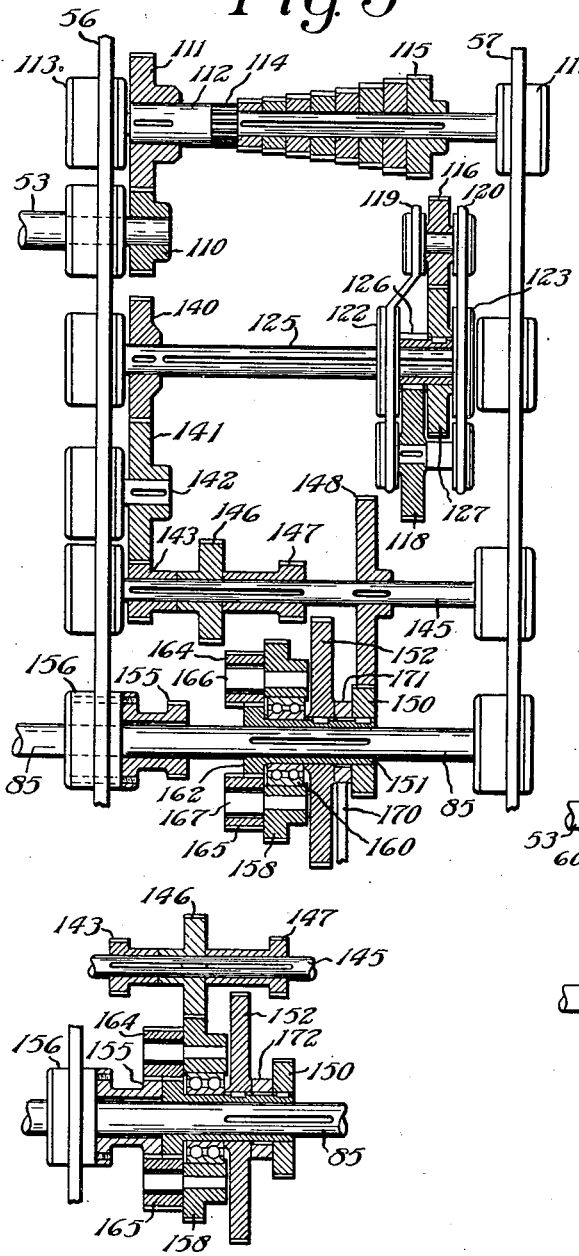
Fig. 3 is a diagrammatic view showing the change speed gear mechanism in a straight line projection.
Fig. 5 is a vertical elevation, on the line 5—5 of Fig. 2, with other parts removed, which shows the clutch and brake mechanism for stopping the wire feed and the cam mechanism for operating the wire cutter.
Fig. 7 is a sectional detail taken on the line 7—7 of Fig. 5 showing the wedge which operates the brake band.
Fig. 8 is a sectional detail on the line 8—8 of Figs. 5 and 7 showing the braking mechanism.
Fig. 10 is a detail showing the planetary gear system of Fig. 3 in an operative position.

It is desirable, in accordance with this invention, to prevent over-running of the wire feeding rolls and to stop them substantially instantaneously when the clutch parts are disconnected. For this purpose, I provide a brake band which is adapted to be thrown into engagement with the drum 74 when the clutch is thrown. This brake band may comprise, as shown in Fig. 8, two semi-cylindrical or arcuate members 92 and 93 which may be lined, if desired, with suitable material for gripping the outer cylindrical face of the drum 74. These two parts of the brake band are supported on a rod 94 bolted on the frame work of the machine, and they are impelled towards the drum surface by means of a spring 95 surrounding a guiding bolt 96 which passes through the projecting parallel ends 97 of each of the brake members. These two ends 97 are faced with blocks 98 which, as shown in Fig. 7, are each beveled at one side so as to form a wedge shaped opening within which a wedge 100 may be forced to spread the brake members apart and to prevent their frictionally engaging the drum 74. This wedge 100 is formed as a nose on a clamp having two arms 102 adapted to be bolted into a fixed engagement with the lever 80, as shown particularly in Figs. 5 and 7. This wedge clamp is so located on the lever 80 that when the clutch is disengaged, the wedge 100 will be moved from contact with the blocks 98; but when the clutch teeth are brought into engagement, the wedge 100 will be thrust between these parts 98 and force them outwardly and so move the brake band out of frictional engagement with the drum. It will thus be seen that as soon as the roller 88 drops into the low part of the face cam 86, then the wedge 100 will be drawn outwardly from the wedge shaped opening formed by the blocks 98 and so allow the spring 95 to clamp the brake tightly on the drum and cause the wire driving rolls 10 and 12 to be stopped.

It will now be appreciated that the length of wire in a given coil will be determined by two factors, the rate of wire feed and the time during which the cams 30 and 86 make a complete revolution. By means of the "Reeves" variable speed transmission above described the rate of movement of all of the machine elements will be varied proportionately. That is, as the wire is fed more rapidly through the machine, the cams will likewise revolve more rapidly and the production of the machine will be increased.

In order to vary the speed ratio between the wire feeding rollers and the cams, I have provided, as a primary feature of this invention, a special change speed mechanism which makes it possible to cut automatically substantially all of the different lengths of wire coil which will be required by the industry. This mechanism serves to change the timing relationship of the wire coiling rolls and the cams, which stop the feeding movement and cause the cutting off of the wire coil. It is to be understood that the other mechanisms shown in the prior Sleeper patents which determine the diameter and the pitch of the coil will be operated by suitable cams, preferably mounted on the same cam shaft 85, and controlled in synchronism with the cams 30 and 86. A description thereof is not required for an understanding of this invention, since the features herein claimed which serve to control the relationship of the wire feeding and the wire cutting will likewise control the other operations in timed relation therewith.

In the preferred embodiment, I preferably utilize a planetary gear system to give an extremely slow motion and a set of selective change speed gears for intermediate or high speeds, which may be used together and with a set of change gears to give a series of speeds which vary only by small increments and so make it possible to make all desired lengths of coils.

Figure 1:
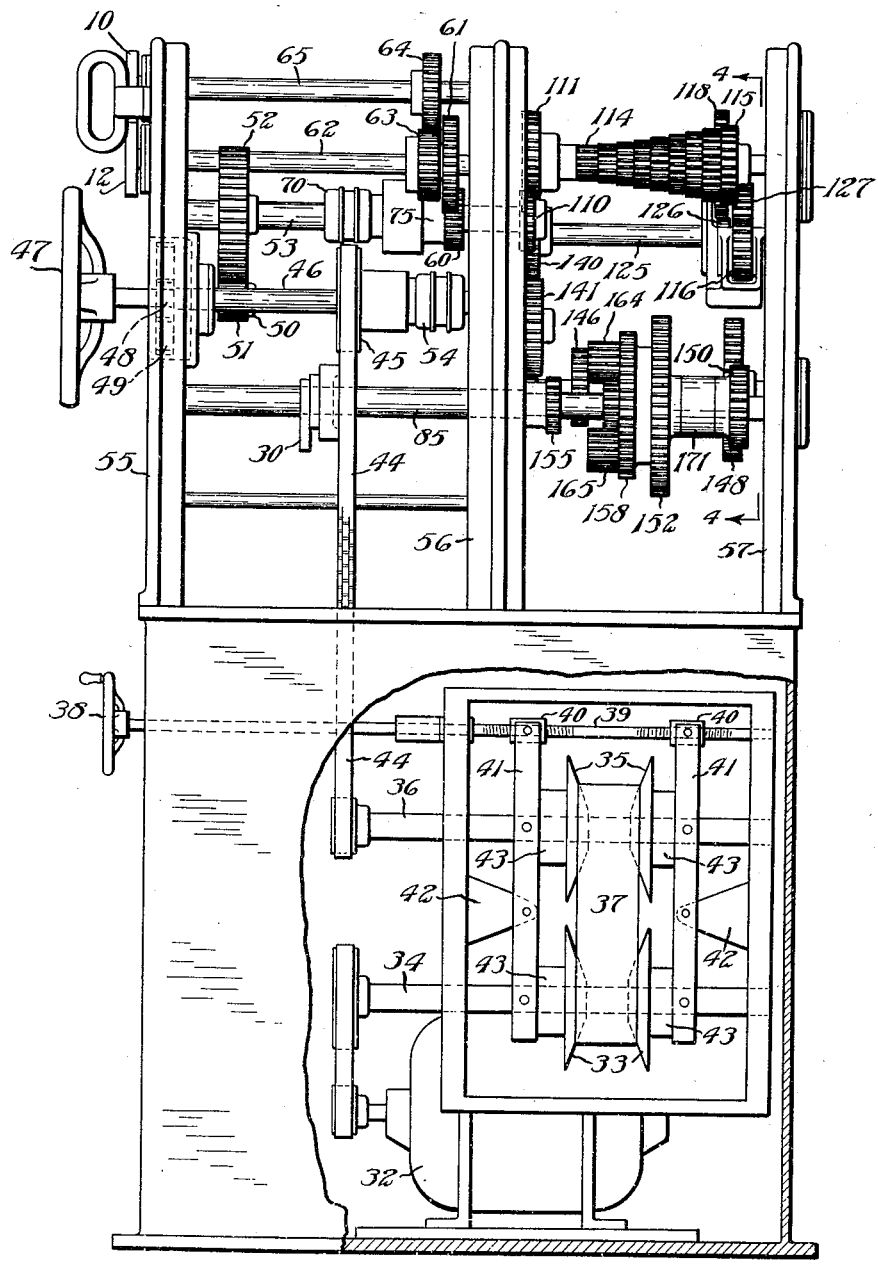
Fig. 1 is a side elevation of the machine with parts removed for the sake of clarity and the base broken away to show the variable speed driving mechanism therein.

The preferred form of speed change transmission is shown in a straight line projection in Fig. 3 which illustrates all of the gears required for the purpose except the change gears 48 and 49 which are to be found adjacent the hand wheel 47 as indicated in Fig. 1 of the drawing. Referring now to Fig. 3, as well as Figs. 1, 4, and 10, it will be noted that the drive shaft 53 which carries the gear 60 connected to rotate the wire driving rolls 10 and 12, passes through the intermediate partition 56 and has a further gear 110 keyed to its end. This gear meshes with a gear 111 keyed to a shaft 112 which is mounted on the partitions 56 and 57 by means of suitable bearings 113. It is to be understood that all of the various shafts are suitably mounted in bearings supported on the frame work of the machine, as indicated in outline in the various parts of the drawings. Keyed on the shaft 112 is a set of gears of gradually increasing sizes in a cone-like arrangement. These gears vary in size from the smallest gear 114 to the largest gear 115 by gradual steps so as to give a desired speed variation.

Any one of the gears 114 to 115 may be selected for operative connection with the cam shaft 85 by means of a pair of rock gears which are so mounted that either one of them may be connected with any one of the gears from 114 to 115. As shown particularly in Figs. 3 and 4, the small gear 116 and the larger gear 118 are mounted for rotation on appropriate short shafts carried on end bearings which are fixed on the V-shaped support comprising the two plates 119 and 120. These plates are provided with centrally located bearings members 122 and 123 which permit them to rock freely on the shaft 125 which in turn is suitably mounted for rotation on the partitions 56 and 57. Slidably keyed to the shaft 125 is a sleeve shaped to provide a small gear 126 which meshes with the gear 118, and keyed on the sleeve of the gear 126 is a further and larger gear 127 which meshes with the gear 116. It will, therefore, be appreciated that if the small gear 116 is meshed with any one of the gears from 114 to 115, then it will transmit a reduced rate of rotation to the shaft 125 through the larger gear 127. If, on the other hand, the comparatively large gear 118, which meshes with the small gear 126, is in contact with one of the selective gears 114 to 115 then a much higher speed will be transmitted to the shaft 125. Hence, by using various combinations of the nine gears in the cone arrangement and the two gears of the rock gear system, one may secure 18 different speeds.

Figure 4:
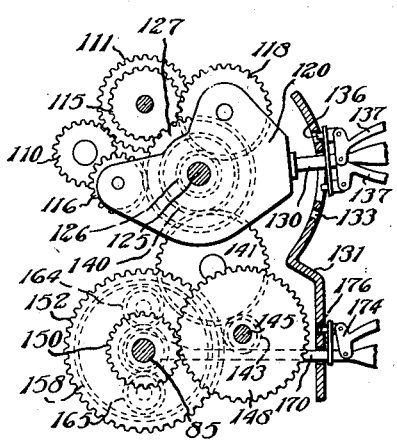
Fig. 4 is an end view of the line 4—4 of Fig. 1 showing the arrangement of the gears.
Figure 9:
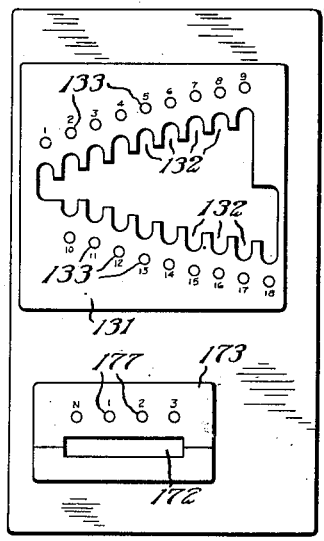
Fig. 9 is an elevation of a portion of the left hand side of the machine shown in Fig. 2, with parts removed, showing the locking plate for the change speed controls.

For the purpose of moving the rock gears to their proper positions and holding them there, any suitable mechanism may be employed; but as shown particularly in Figs. 4 and 9 this may comprise a handle bar 130 which projects outwardly from a cross member between the two plates 119 and 120. This bar 130 passes through a plate 131 on the machine wall which is cut away as indicated in Fig. 9 so as to provide a series of recesses 132 within which the bar 30 may be moved and held in a stationary position. Two series of holes 133 are formed in the plate 131, and these are arranged to be engaged by one of two plunger pins 136 (Fig. 4) which may be moved by one of two handles 137 suitably pivoted on the bar 130. When one of the pins 136 is inserted in one of the holes 133, the bar 130 is held in a suitable slot 132 and one of the rock gears is in mesh with a given gear of the cone series. The upper slots 132 and holes 133 are for use in holding the larger gear 118 to mesh with any one of the cone arranged gears, while the lower series are for rocking the smaller gear 116 into a corresponding meshing arrangement.

Keyed on the far end of the shaft 125 is a further gear 140 meshing with a gear 141 on a short jack shaft 142 which in turn meshes with a small gear 143 keyed on a long shaft 145 mounted for rotation in suitable bearings on the frame members 56 and 57. Three other gears 146, 147 and 148 are likewise keyed on the shaft 145 in such locations that they will serve selectively either for a direct connection with the cam shaft 85 or the employment of a planetary slow motion gear system.

The cam shaft 85 passes through bearings in the machine plate 56 and its outer end is supported in further bearings on the wall 57. This shaft 85 carries a gear 150 connected thereto which is so shaped and arranged that it may be brought into mesh with the large gear 148 on the shaft 145 and thus serve as a direct and high speed drive from the shaft 145 to the cam shaft. It will be noted that the gear 150 is mounted on the cam shaft by means of an intermediate sleeve 151 which is slidably keyed on the shaft. The gear 150 is keyed directly to this sleeve. A further large gear 152 is keyed to the sleeve 151 and this gear is of such a size and location that it may be brought into mesh with the gear 147 fixed on the rotatable shaft 145. When any one gear on the shaft 145 meshes with a gear on the shaft 85, then, of course, the other gears are not in driving engagement. By means of these two sets of gears a slow motion or a higher speed motion may be transmitted from the shaft 145 to the cam shaft 85.

For the purpose of obtaining a very slow speed motion I employ a planetary gear system, as shown particularly in Figs. 1, 3, and 10, which comprises a stationary gear 155 which is bolted to the casing 156 carrying the bearings for the rotatable shaft 85, and the latter is rotatable within the gear 155. A freely rotatable gear 158 is so mounted on the shaft 85 that it may be moved longitudinally into meshing engagement with the gear 146 keyed on the shaft 145. This gear 158 is preferably mounted on a set of ball bearings 160, the inner raceway of which is suitably supported on the sleeve 151 as illustrated.

This sleeve has a shoulder formed as a further small gear 162 which is of the same diameter as the gear 155. This gear 162 will therefore hold the ball bearings in place and insure proper positioning of the gear 158. Two small gears 164 and 165 are suitably mounted for rotation on the short shafts 166 and 167 which are in turn supported on the side of the gear plate 158. The locations and sizes of the parts are such that when the gear 158 is moved to the left, as shown in Fig. 10, to engage the gear 146 on the upper shaft 145, then the gears 164 and 165 will likewise mesh with the stationary gear 155 as well as the gear 162. There is, however, a difference in the number of teeth on the two gears 155 and 162 whereby the gear 162 has one more tooth than has the gear 155 so as to cause a planetary motion of the gears 164 and 165. That is, when the gear 146 rotates the gear 158 it carries the gears 164 and 165 around the axis of the shaft 85 and these small gears are caused to rotate on their axes by the stationary gear 155. But owing to the fact that the gear 162 has one more tooth than has the stationary gear 155 it will be advanced by that one tooth for each complete rotation of the gear 158 and thus will rotate the shaft 85 by the distance represented by that one tooth on the gear 162, thus transmitting a very slow motion from the driving gear 146 to the cam shaft.

For the purpose of shifting the planetary gear system from a neutral position into the various arrangements above described, a shifting arm 170 (Figs. 3 and 4) is suitably connected to a sleeve 171 slidably interposed between the gears 150 and 152. The shift arm 170 passes outwardly through a slot 172 in the plate 173 (Fig. 9) and is provided with a handle 174 of the type above described so that the shift arm may be moved in the slot and locked in position by means of the pins 176 engaging any one of the holes 177 in the plate, as will be understood.

As a further means for changing the relative speeds of the wire coiling and cutting-off mechanism, the gears 48 and 49 (Figs. 1 and 2) may be so arranged that these gears may be easily replaced by other sets of gears having the required dimensions to give two or more changes of speed between the driving shaft 46 and the driven jack shaft 50. Thus by means of these various speed change systems it is possible for one to drive the cam shaft either at a high rate of speed which insures cutting off of a very short coil of wire or at an extremely slow speed which will permit several hundred inches of wire to be fashioned into a coil before the cutters will operate.

The operation of this machine will be obvious from the above disclosure. Depending upon the size of the wire and other working conditions, the variable speed transmission in the base of the machine may be set to feed the wire at a desired rate. This may be further varied by replacing the gears 49 and 48 (Fig. 2) by another pair of gears of a desired speed ratio. For example, these gears may have a ratio of 18 to 52, or 35 to 35, or 52 to 18; and the two sets of gears required for these ratios will serve in combination with the rest of the change speed mechanism to give all required cam speeds. Having selected the required feed roll speed, then the different sets of selective gear systems may be suitably adjusted to give the required cam speeds. For example, with a drive gear ratio of 18 to 52 for the two gears 49 and 48, one may obtain a wire feed of 12 feet per minute by properly adjusting the "Reeves" transmission. Then, the other combinations of the gears 48 and 49 will serve to give 35 and 100 feet per minute of wire feed. By shifting the speed control lever 130 into the slot 1 of Fig. 9 and thereby meshing the small gear 116 with the largest gear 115 and by so locating the lower lever 170 in position 1 (Fig. 9) that gear 148 meshes with gear 150, the cam shaft may be revolved at 115 R. P. M., and this will give a wire feed of about 0.75 inch before the cutter operates to sever a coil from the wire. The speed of the cam shaft may now be successively decreased by selectively moving the selector gear 116 from one gear to another in the cone series until position No. 11 (Fig. 9) has been reached and this will coil a wire of approximately 2.5 inches length. If the drive gears 48 and 49 are now exchanged for gears of equal numbers of teeth, then the speed of the cam shaft may be further decreased while the selector gear 116 is successively meshed with the remaining gears in positions 12 to 18 of handle 130. The next slower speed is obtained by shifting the lever 170 to the intermediate position No. 2 to bring the gears 147 and 152 into mesh, while the upper lever 130 is in position No. 1. If the gears 49 and 48 are again changed to the arrangement shown in Fig. 2 to provide the gear ratio of 52 to 18, then as the hand control lever 130 is shifted again through the series of numbers 1 to 18 represented in Fig. 9, a still further reduction in cam speed is serially obtained. Then finally, the planetary gear system may be brought into operation by connecting gears 146 and 158 and the cam speed may be again varied through a gradually decreasing series by again moving the lever 130 through the various positions of 1 to 18. The final slowest speed represented by position 18 when the planetary gear system is in play will give a cam shaft speed of 1.6 R. P. M. or a wire coil feed of approximately 500 inches before the cutter operates to sever the coil. It is to be understood that the drawings are diagrammatic and not dimensional in their showing and that these numerical examples will, of course, depend upon having the gears of required suitable sizes and ratios and that these examples are given merely by way of illustration of the adaptability of the machine.

When it is desired to operate the machine continuously and make a coil of indeterminate length, then it is merely necessary to move the lower speed control handle 170 to the position represented by the letter "N" in Fig. 9, which thus disconnects all of the gears of the lower selective planetary gear system from operative association with the cam shaft 85. The cam shaft is rotated manually by hand wheel 47 to a position in which the cam roller 88 engages the high surface of the cam 86 and thus holds the clutch engaged and the brake released. Then when the cam shaft is disconnected from the selective gear systems, the machine will operate continuously and produce a coil for as long as the wire is fed to the feed rollers. If desired, a clutch may be interposed in the shaft 85 or in any of the variable speed mechanism, which will also serve to disconnect the power drive from the cams. Other equivalent mechanisms may, of course, be employed.

It will also be understood that the gears 48 and 49 may be replaced by another change speed system of the type of any above described, but the construction illustrated is the preferred form because of the simplicity of the mechanism involved. The speed changes, except for the comparatively simple operation of changing gears 48 and 49, are all accomplished by the quick shifting of manually operated levers. By means of tables of wire lengths, cam speeds and lever positions it is possible for the operator to change the machine without delay to get any wire coil length that is desired. If desired, one may use an adjustable cam for throwing the clutch so as to give a finer adjustment than permissible with the construction illustrated. Moreover, the cutter cam may be so shaped as to consume the minimum of time for the cutting operation and the machine may then be operated with maximum efficiency, whereas the original segment type of machine required a waste of about half of the time during which no coiling took place while the segment was returning for a further operative stroke.

The requirements of this type of machine are peculiar, in that coils of all lengths of very small increments of variation are required, but by the special arrangement of gear systems herein described, which will comprise suitable ratios of gear teeth as will be understood by one skilled in the art, one may make substantially all coil lengths required in the industry. It is also to be understood that one may vary the construction of the variable speed mechanisms materially by substituting equivalent change speed mechanisms for the ones herein illustrated and described. For example, a transmission drive of the type shown in the base of the machine may be employed in place of any or all of the selective gear systems for giving a wide variation in speeds. Also, variable speed friction drives are adapted for this cam speed control. It is, however, preferred to employ the construction illustrated because of its extreme accuracy and ability to duplicate wire coil lengths without variation. However, numerous modifications may be made as above indicated without departing from the scope of this invention.

Having thus described my invention, what I claim as new and protectable by Letters Patent is:

1. A wire coiling machine comprising a wire coiling device, a clutch controlled driving mechanism, including positively driven feed rolls, for feeding wire to said device and causing it to be coiled thereby, means including a movably mounted wire cutter to sever the wire, a continuously operating, cam controlled mechanism including a cam to operate the clutch and intermittently stop the wire feeding operation of the feed rolls and a cam to cause the cutter to sever a coil from the stationary wire, and manually controlled, power driven, variable speed mechanism connected to operate the cam mechanism at a selected rate, whose ratio relative to that of the feed rolls may be widely varied.

2. A wire coiling machine comprising a wire coiling device, mechanism including a clutch and feed rolls for feeding wire to said device and causing it to form a coil of indeterminate length, means including a movably mounted cutter to sever a coil from the wire, two cams rotated in timed relationship, means operated by one cam to disconnect the clutch and cause the wire feed to stop, means operated by the other cam to cause the cutter to sever a coil from the stationary wire, power driven, variable speed mechanism to rotate said cams at a selected rate, the ratio of which to that of the feed rolls may be widely varied, and a manually operated device for selecting any desired speed ratio.

3. A wire coiling machine of the type covered by claim 1 in which the variable speed mechanism comprises a selective gear system and means associated therewith which can be manually shifted to give speed changes of small increments of variation and thereby produce a series of wire coils of different lengths.

4. A wire coiling machine of the type covered by claim 1 in which the variable speed mechanism comprises a plurality of sets of selective gears and selector gears arranged to be connected operatively in various combinations which will give required lengths of wire coils of small increments of variation from a short coil to one of great length and separate manually operable means for quickly connecting the gears in each set as desired.

5. A wire coiling machine of the type covered by claim 2 in which the variable speed mechanism comprises a slow motion planetary gear system for producing exceedingly slow speeds, a second system including a set of selective gears of different sizes and a selector gear associated therewith for giving a series of higher speeds and means for selectively connecting one or both of said systems to the cam mechanism for driving the cams at a desired speed.

6. A wire coiling machine of the type covered by claim 2 in which the variable speed mechanism for driving the cams comprises a planetary gear system arranged to give a very slow motion, a selective gear system having sets of selective gears and selector gears adapted to give a wide range of speeds, and means for disconnecting the planetary gear system and employing only the selective gear system or for selectively connecting a desired combination of gears in the selective gear system with the planetary system so as to provide a wide variation of speeds for the cams.

7. A wire coiling machine of the type covered by claim 1 comprising a variable speed driving mechanism which serves to drive both the feed rolls and the cams in an invariable timed relationship but at a desired variable speed.

8. A wire coiling machine comprising a wire coiling device including feed rolls for moving the wire and causing it to form a coil of indeterminate length, a variable speed power driving mechanism, means including a clutch which connects said mechanism to operate the feed rolls, an automatically actuated rotatable cam to throw the clutch and stop the wire feed, a wire cutter, means including a second cam rotated in timed relation with the first cam which serves to operate the cutter and sever the wire when the feed rolls are stationary, and a variable speed mechanism driven by said power driving mechanism and including a manually operated speed selective device which is arranged to rotate the cams at a widely variable but definite speed and thereby cause the wire to be coiled into predetermined lengths and severed at a definite but variable rate.

9. A wire coiling machine comprising a wire coiling device, a power driving mechanism including a clutch and rolls for feeding wire to the coiling device and causing it to form continuously a coil of indeterminate length, means including a movably mounted wire cutter to sever the wire, cam controlled mechanism to cause the cutter to operate intermittently, a cam mechanism operating in timed relation with the cutter controlling cam to disconnect said clutch when a predetermined length of wire has been coiled and just prior to the operation of the cutter, and a brake associated therewith to stop the movement of the wire as soon as the clutch is thrown.

10. A machine of the type covered by claim 8 which comprises a releasable brake associated with the wire feed mechanism and means actuated in timed relation with the clutch which causes the brake to stop the wire feed at once after the clutch has been disconnected.

11. A machine of the type covered by claim 2 comprising a releasable spring pressed brake associated with and tending to stop the clutch controlled wire feeding mechanism, a device to hold the brake released and means operated by the clutch actuating cam which moves the brake holding device to cause operation of the brake when the wire is to be severed.

12. A machine of the type covered by claim 2, comprising means for disconnecting the variable speed mechanism from the cams which control the clutch and the wire cutter and thereby preventing intermittent operation thereof and causing a continuous wire coiling operation.

13. A wire coiling machine comprising a wire coiling device, mechanism to feed the wire to said device, and cause the same to be coiled continuously, a clutch to control said mechanism, means including a rotatable cam to operate the clutch, a wire cutter, means including a rotatable cam to operate said cutter, in timed relation with the clutch, a variable speed mechanism connectable to rotate the cams at a selected predetermined rate, and cause wire coils of predetermined lengths to be formed and severed from the wire, a manually operable device for selectively connecting the cams with said variable speed mechanism or disconnecting the same, and manually operable means for so positioning the clutch control cam as to hold the clutch permanently connected so that wire may be coiled continuously.

14. A wire coiling machine comprising a variable speed power driven mechanism, a wire coiling device, means including a clutch driven by said mechanism and feed rolls to feed wire to said device and cause the wire to be coiled continuously at a controlled rate, means including a rotatable cam for operating the clutch, a wire cutter arranged to sever a coil from the wire, means including a cam rotated in synchronism with the clutch cam which serves to operate the cutter when the clutch is disconnected, a change speed mechanism driven by said power mechanism, a manually operable selective device for connecting the change speed mechanism to rotate the cams at a predetermined but variable speed, means for disconnecting the power connection from the change speed mechanism to the cams and a manually operable device for setting the clutch cam in a position which insures that the clutch will stay connected when the cutter cam is not operated so that wire may be coiled continuously for an indefinite time.

WILLIAM H. BLOUNT.